United States Patent
Qin

(10) Patent No.: US 9,971,186 B2
(45) Date of Patent: May 15, 2018

(54) DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Yun Qin, Beijing (CN)

(73) Assignees: BOE TECHNOLOGY GROUP CO., LTD., Beijing (CN); BEIJING BOE CHATANI ELECTRONICS CO., LTD., Beijing (CN)

(*) Notice: Subject to any disclaimer, the term of this patent is extended or adjusted under 35 U.S.C. 154(b) by 142 days.

(21) Appl. No.: 14/893,913

(22) PCT Filed: Jul. 17, 2015

(86) PCT No.: PCT/CN2015/084353
§ 371 (c)(1),
(2) Date: Nov. 24, 2015

(87) PCT Pub. No.: WO2016/123915
PCT Pub. Date: Aug. 11, 2016

(65) Prior Publication Data
US 2016/0357060 A1    Dec. 8, 2016

(30) Foreign Application Priority Data

Feb. 3, 2015  (CN) .......................... 2015 1 0056050

(51) Int. Cl.
*G02F 1/1335* (2006.01)
*F21V 8/00* (2006.01)
*G02F 1/1333* (2006.01)

(52) U.S. Cl.
CPC ..... *G02F 1/133512* (2013.01); *G02B 6/0053* (2013.01); *G02B 6/0056* (2013.01);
(Continued)

(58) Field of Classification Search
CPC ............. G02F 1/133512; G02F 1/1336; G02F 1/133308; G02F 2202/28;
(Continued)

(56) References Cited

U.S. PATENT DOCUMENTS 8,743,310 B2 * 6/2014 Yan ..................... G02F 1/13452
345/905
9,488,772 B2 * 11/2016 Momose ........... G02F 1/133308
(Continued)

FOREIGN PATENT DOCUMENTS

CN     202056679 U     11/2011
CN     202870439 U     4/2013
(Continued)

OTHER PUBLICATIONS

Chinese Office Action with English Language Translation, dated Dec. 23, 2016, Chinese Application No. 201510056050.6.
(Continued)

*Primary Examiner* — Hoan C Nguyen
(74) *Attorney, Agent, or Firm* — Womble Bond Dickinson (US) LLP

(57) ABSTRACT

The present invention relates to the field of display technology, and discloses a display device, which comprises a display panel and a backlight module, a shading tape being provided between the backlight module and the display panel along the edges of the display panel. In the edges of the display panel, a edge near the light strip and having a extending direction parallel to that of the light strip is a light incoming edge, and each end of the light incoming edge forms a light incoming corner with an end of an adjacent edge; the shading tape provided at each the light incoming corner, the shading tape provided at the main body of the light incoming edge, and the shading tape provided at the main body of the adjacent edge forming the light incoming
(Continued)

corner with the light incoming edge are separate from each other; in the side, which faces the display panel, of the shading tape provided at the edges of the display panel, only the shading tape provided at the parts, except the light incoming corner, of the edges of the display panel is provided with an adhesive layer. A phenomenon of water ripple and light leakage does not easily occur at the portion of the display panel of the display device which corresponds to the light incoming corner.

14 Claims, 4 Drawing Sheets

(52) U.S. Cl.
CPC ......... *G02B 6/0068* (2013.01); *G02F 1/1336* (2013.01); *G02F 1/133308* (2013.01); *G02F 2001/133317* (2013.01); *G02F 2201/503* (2013.01); *G02F 2202/28* (2013.01)

(58) Field of Classification Search
CPC ... G02F 2001/133317; G02F 2201/503; G02B 6/0053; G02B 6/0056; G02B 6/0068
USPC ..................................................... 349/58, 62
See application file for complete search history.

(56) References Cited

U.S. PATENT DOCUMENTS

| | | | |
|---|---|---|---|
| 2009/0033819 | A1 | 2/2009 | Nakagawa |
| 2012/0169959 | A1* | 7/2012 | Wei .......................... H05K 5/02 349/58 |
| 2013/0070180 | A1 | 3/2013 | Kuriyama |
| 2013/0258232 | A1* | 10/2013 | Zhou ................. G02F 1/133308 349/58 |
| 2015/0253484 | A1* | 9/2015 | Araki ................... G02B 6/0031 349/65 |

FOREIGN PATENT DOCUMENTS

| | | |
|---|---|---|
| CN | 203561805 | 4/2014 |
| CN | 203561805 U | 4/2014 |
| CN | 203757522 | 8/2014 |
| CN | 204127794 | 1/2015 |
| CN | 104570485 | 4/2015 |
| JP | 2001108987 A | 4/2001 |
| JP | 2005084510 A | 3/2005 |

OTHER PUBLICATIONS

International Search Report and Written Opinion with English Language Translation, dated Oct. 13, 2015, Application No. PCT/CN2015/084353.

* cited by examiner

DISPLAY DEVICE

TECHNICAL FIELD

The invention refers to a technical field of display, and specifically to a display device.

BACKGROUND

Currently, a display device of intermediate or small size includes a display panel and a backlight module for providing light source for the display panel, which backlight module includes a back plate, a light guide plate and a light strip mounted in the back plate. The display panel is mounted on the back plate of the backlight module, and a shading tape disposed along the edges of the display panel is provided between the display panel and the back light module, for preventing light leakage defect from occurring in the display device.

In the backlight module, a side of the light guide plate that is provided with a light strip is a light incoming side, and a edge at which the side of the display panel's sides which is opposite to the light incoming side of the backlight module is a light incoming edge. An end of the light incoming edge forms a light incoming corner with an end of an edge, and the other end of the light incoming edge forms a light incoming corner with an end of another edge. Since the light intensity incoming from a side of the light incoming surface of the light guide plate is larger, for achieving good shading effect, the shading tape at the light incoming edge and the light incoming corner of the display panel has a larger width. Beside, for the commercial requirement of thinning product, the display panel is increasing thinner, and an extrusive stress easily occurs when the corner of the thinning display panel is stuck by large area, resulting in water ripple in the picture of the display panel. Therefore, a phenomenon of water ripple and light leakage easily occurs in a portion of the display panel which corresponds to the light incoming corner.

SUMMARY

The invention provides a display device, wherein a phenomenon of water ripple and light leakage does not easily occur in a portion of a display panel which corresponds to a light incoming corner.

For achieving the above object, the invention provides the following technical solution:

A display device, comprising a display panel and a backlight module, which backlight module comprises a back plate, a light guide plate and a light strip mounted in the back plate, the display panel being mounted on the back plate, and a shading tape disposed along the edges of the display panel being provided between the backlight module and the display panel; in the edges of the display panel, each end of a edge close to the light strip and having a extending direction parallel to that of the light strip, i.e. a light incoming edge forms a light incoming corner with an end of an adjacent edge; the shading tape provided at each light incoming corner, the shading tape provided at the main body, except the ends, of the light incoming edge, and the shading tape provided at the main body, except the ends, of the adjacent edge forming the light incoming corner with the light incoming edge are separate from each other; in the side, which faces the display panel, of the shading tapes provided at the edges of the display panel, only the shading tape provided at the parts of the edges of the display panel except the light incoming corners is provided with an adhesive layer.

In the display device, the shading tape provided at each light incoming corner, the shading tape provided at the main body of the light incoming edge, and the shading tape provided at the main body of the adjacent edge forming the light incoming corner with the light incoming edge are separate from each other, that is have a separated structure; and only the shading tape provided at the parts of the edges of the display panel except the light incoming corners is provided with an adhesive layer, that is, the side, which faces the display panel, of the shading tape provided at the light incoming corners is not provided with an adhesive layer, i.e. does not been stuck to the display panel, so the parts of the display panel which correspond to the light incoming corners would not create extrusive stress due to the sticking of the shading tape. Therefore, a phenomenon of water ripple and light leakage does not easily occur in a portion of a display panel which corresponds to a light incoming corner.

Accordingly, a phenomenon of water ripple and light leakage does not easily occur in a portion, which corresponds to a light incoming corner, of the display panel of the display device.

Preferably, a side, which faces the backlight module, of the shading tape provided at the edges of the display panel is provided with an adhesive layer.

Preferably, the shading tape is located between the display panel and the back plate.

Preferably, the backlight module further comprises a prism mounted in the back plate and located between the light guide plate and the display panel, a protection layer located between the prism and the display panel; the shading tape is located between the display panel and the protection layer of the backlight module.

Preferably, the display panel comprises a lower polarizer, an array substrate, a liquid crystal layer, a color film layer and a upper polarizer which are arranged in turn from the light incoming side to the light outgoing side; when a side of the lower polarizer which is near the light incoming edge is located on a side of the array substrate which faces the backlight module, and a stepped structure is formed between the lower polarizer and the array substrate, an adhesive strip is provided between the shading tape at the main body and at the light incoming corner of the light incoming edge and the array substrate, for compensating for the gap in a panel thickness direction between the shading tape and the array substrate.

Preferably, the adhesive strip provided between each the light incoming corner and the array substrate and the adhesive strip provided between the main body of the light incoming edge and the array substrate are separate from each other; in the side, which faces the display panel, of the adhesive strip provided between the light incoming corner and the array substrate and the adhesive strip provided between the main body of the light incoming edge and the array substrate, only the adhesive strip provided between the main body of the light incoming edge and the array substrate is provided with an adhesive layer.

Preferably, an adhesive layer is provided in the side, which faces the shading tape, of the adhesive strip provided between each the light incoming corner and the array substrate and the adhesive strip provided between the main body of the light incoming edge and the array substrate, and the side of the adhesive strips which faces the shading tape is stuck to the shading tape.

Preferably, the backlight module comprises two light strips, which are disposed oppositely to two opposite sides of the light guide plate, and accordingly there are two light incoming edges of the display panel.

BRIEF DESCRIPTION OF FIGURES

Throughout the figures, like reference signs refer to like parts.

DETAIL EMBODIMENTS

The technical solutions in the embodiments of the invention will be described clearly and completely below in conjunction with the figures in the embodiments of the invention. Apparently, the embodiments described are only part of the embodiments of the invention, rather all of the embodiments. All other embodiments obtained by those ordinary skilled in the art based on the embodiments of the invention without expending creative effort are within the protection scope of the invention.

Figure 1:
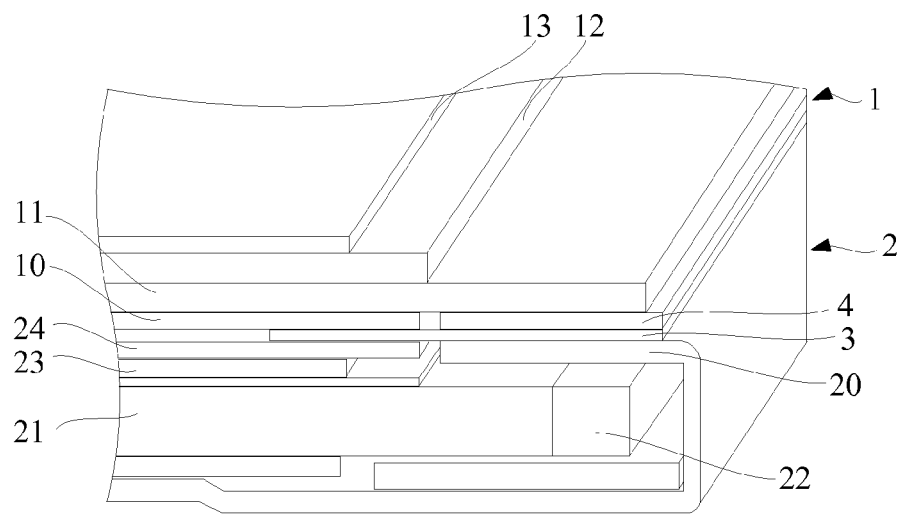
FIG. 1 is a structure schematic view of a display device provided by an embodiment of the invention.
Figure 2:
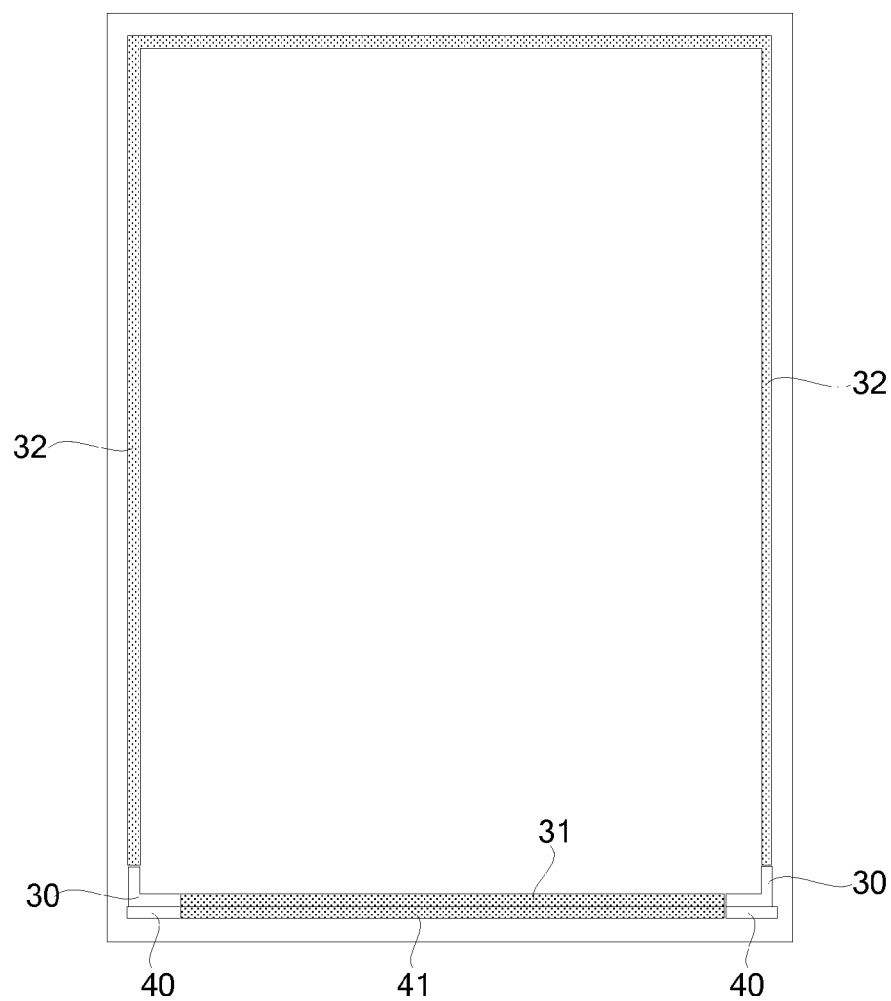
FIG. 2 is an arrangement schematic view of a shading tape and a display panel of a display device provided by an embodiment of the invention.
Figure 3:
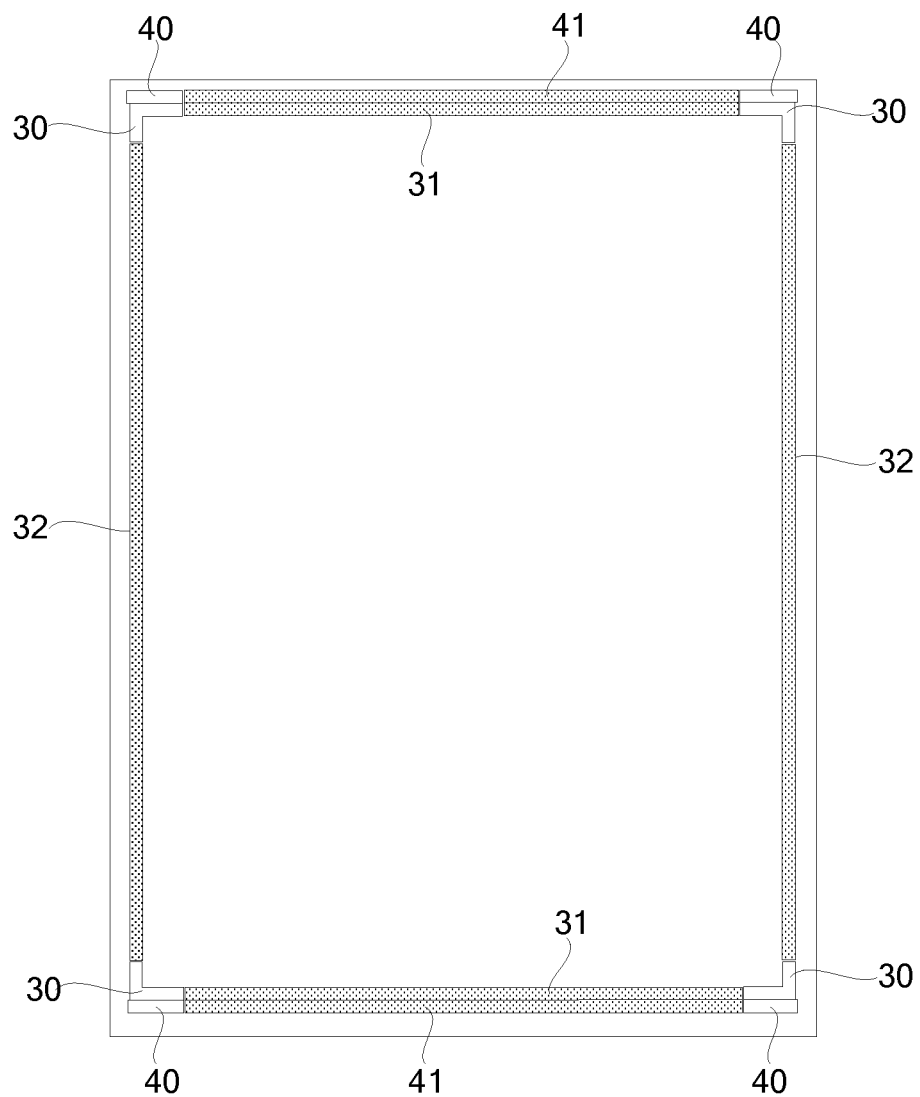
FIG. 3 is an arrangement schematic view of a shading tape and a display panel of another display device provided by an embodiment of the invention.
Figure 4:
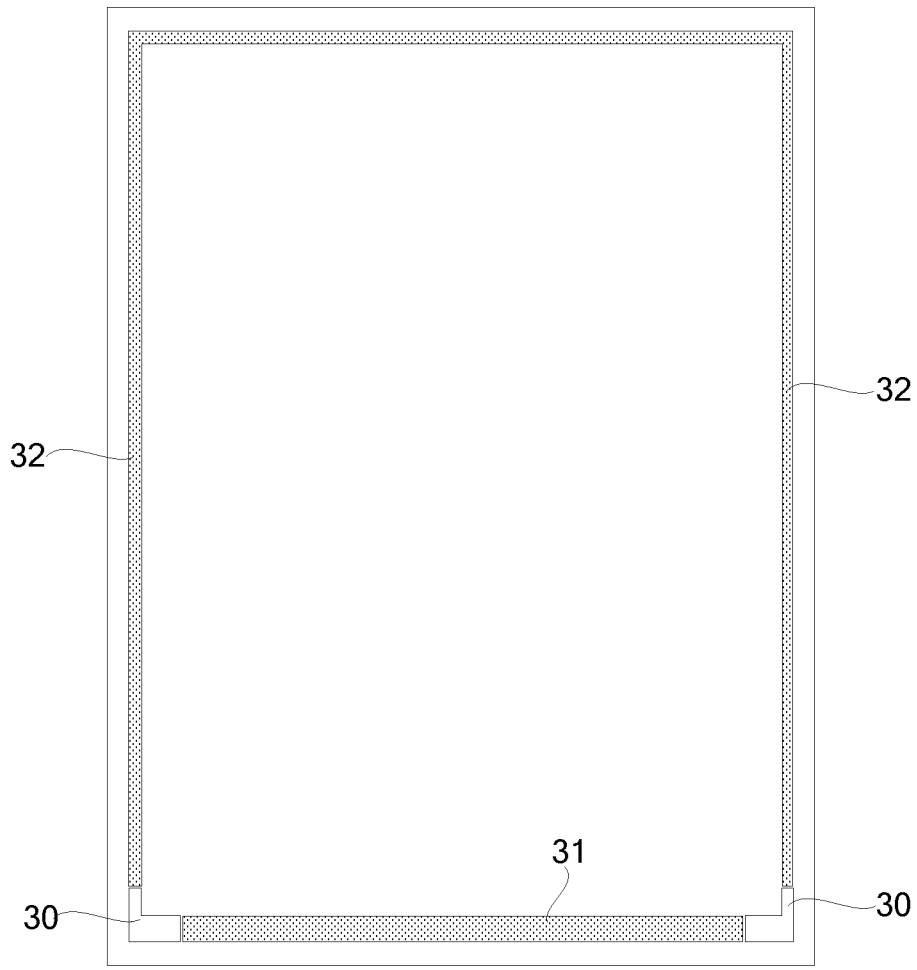
FIG. 4 is an arrangement schematic view of a shading tape and a display panel of another display device provided by an embodiment of the invention.
Figure 5:
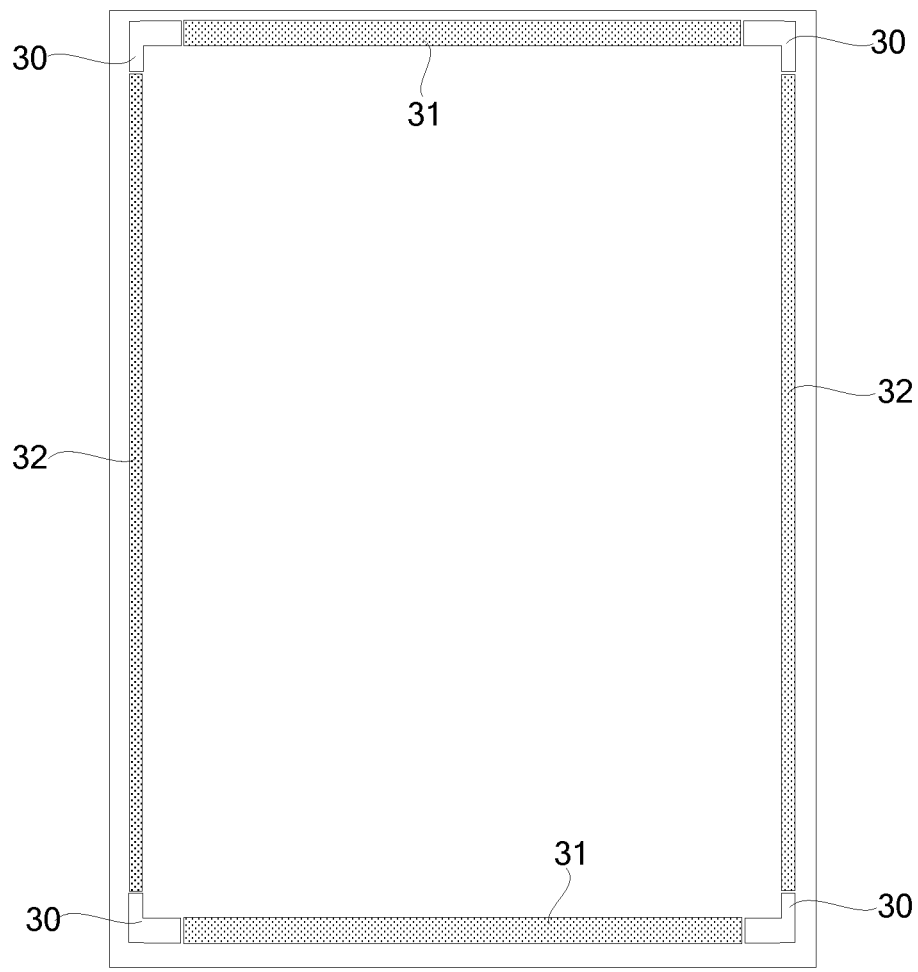
FIG. 5 is an arrangement schematic view of a shading tape and a display panel of another display device provided by an embodiment of the invention.

Please refer to FIGS. 1, 2, 3, 4 and 5: therein FIG. 1 is a structure schematic view of a display device provided by an embodiment of the invention; FIG. 2 is an arrangement schematic view of a shading tape and a display panel of a display device provided by an embodiment of the invention; FIG. 3 is an arrangement schematic view of a shading tape and a display panel of another display device provided by an embodiment of the invention; FIG. 4 is an arrangement schematic view of a shading tape and a display panel of another display device provided by an embodiment of the invention; FIG. 5 is an arrangement schematic view of a shading tape and a display panel of another display device provided by an embodiment of the invention.

As shown in FIGS. 1, 2 and 4, the display device provided by the invention comprises a display panel 1 and a backlight module 2, which backlight module 2 comprises a back plate 20, a light guide plate 21 and a light strip 22 mounted in the back plate 20, the display panel 1 having a polygon structure and being mounted on the back plate 20, and a shading tape 3 disposed along the edges of the display panel 1 being provided between the back plate 20 of the backlight module 2 and the display panel 1; in the edges of the display panel 1, an edge opposite to a side of the light strip 22 which faces the display panel 1 and having a extending direction parallel to that of the light strip 22 is a light incoming edge, that is, in the edges of the display panel 1, a edge close to the light strip 22 and having a extending direction parallel to that of the light strip 22 is the light incoming edge; each end of the light incoming edge forms a light incoming corner with an end of an adjacent edge, and the portion of the edge except the ends is a main body of the edge; the shading tape 30 provided at each light incoming corner, the shading tape 31 provided at the main body of the light incoming edge, and the shading tape 32 provided at the main body of the adjacent edge forming the light incoming corner with the light incoming edge have a separated structure, i.e. are separate from each other; in the side, which faces the display panel 1, of the shading tapes 3 provided at the edges of the display panel 1, only the shading tape provided at the parts of the edges of the display panel 1 except the light incoming corners is provided with an adhesive layer, i.e. is stuck to the display panel.

In the display device, the shading tape 30 provided at each light incoming corner, the shading tape 31 provided at the main body of the light incoming edge, and the shading tape 32 provided at the main body of the adjacent edge forming the light incoming corner with the light incoming edge have a separated structure; and only the shading tape 30 provided at the parts of the edges of the display panel 1 except the light incoming corners is provided with an adhesive layer, that is, the side, which faces the display panel 1, of the shading tape 30 provided at the light incoming corners is not provided with an adhesive layer, so the parts of the display panel 1 which correspond to the light incoming corners would not be stuck by the shading tape 30, and thus would not create extrusive stress due to the sticking of the shading tape 30. Therefore, a phenomenon of water ripple and light leakage does not easily occur in a portion of a display panel 1 which corresponds to a light incoming corner.

Accordingly, a phenomenon of water ripple and light leakage does not easily occur in a portion, which corresponds to a light incoming corner, of the display panel 1 of the display device.

As shown in FIGS. 1, 2 and 4, in a specific embodiment, the backlight module 2 further comprises a prism 23 mounted in the back plate 20 and located between the light guide plate 21 and the display panel 1, a protection layer 24 located between the prism 23 and the display panel 1; the shading tape 3 is located between the display panel 1 and the protection layer 24 of the backlight module 2.

As shown in FIGS. 1, 2 and 4, on the base of the above embodiment, in a specific embodiment, a side, which faces the backlight module 2, of the shading tape 3 provided at the edges of the display panel 1 is provided with an adhesive layer, and a side of the shading tape 3 which faces the backlight module 2 is stuck to the protection layer 24 of the backlight module 2 and to the back plate 20, for shielding the light coming into the edge of the display panel 1.

As shown in FIGS. 1 and 2, on the base of the above embodiments, in a specific embodiment, the display panel 1 comprises a lower polarizer 10, an array substrate 11, a color film layer 12 and a upper polarizer 13 which are arranged in turn from the light incoming side to the light outgoing side; when a side of the lower polarizer 10 which is near the light incoming edge is located on a side of the array substrate 11 which faces the backlight module 2, and a stepped structure is formed between the lower polarizer 10 and the array substrate 11, an adhesive strip 4 is provided between the shading tape 3 at the light incoming edge and at the light incoming corner and the array substrate 11, and the adhesive strip 4 is able to compensate for the gap in a panel thickness direction between the shading tape 3 and the array substrate 11.

As shown in FIGS. 4 and 5, when the side of the lower polarizer 10 which is located near the light incoming edge is aligned with the side of the array substrate 11 which is located near the light incoming edge, the adhesive strip 4 may also not been provided. Therein, FIG. 4 is a structure diagram of the display panel with one light incoming edge and without the adhesive strip, while FIG. 5 is a structure diagram of the display panel with two light incoming edges and without the adhesive strip.

As shown in FIGS. 1 and 2, on the base of the above embodiments, in a specific embodiment, the adhesive strip 40 provided between each the light incoming corner and the array substrate 11 and the adhesive strip 41 provided between the main body of the light incoming edge and the array substrate 11 have a separated structure; in the side, which faces the display panel, of the adhesive strip 40 provided between the light incoming corner and the array substrate 11 and the adhesive strip 41 provided between the main body of the light incoming edge and the array substrate 11, only the adhesive strip 41 provided between the main body of the light incoming edge and the array substrate 11 is provided with an adhesive layer, and the side of the adhesive strip 41 which faces the display panel 1 is stuck to the array substrate 11.

Since the adhesive strip 40 provided between each the light incoming corner and the array substrate 11 and the adhesive strip 41 provided between the main body of the light incoming edge and the array substrate 11 have a separated structure, and the side, which faces the display panel 1, of the adhesive strip 40 provided between the light incoming corner and the array substrate 11 is not provided with an adhesive layer, the light incoming corner would not cause water ripple creating in the picture of the display panel 1 due to the extrusive stress generated by sticking adhesive strip 4. Therefore, a phenomenon of water ripple and light leakage does not occur in a portion, which corresponds to a light incoming corner, of the display panel 1, due to stick the adhesive strip 4.

As shown in FIGS. 1 and 2, on the base of the above embodiments, in a specific embodiment, an adhesive layer is provided in the side, which faces the shading tape 3, of the adhesive strip 40 provided between each the light incoming corner and the array substrate 11 and the adhesive strip 41 provided between the main body of the light incoming edge and the array substrate 11, that is, the side of the adhesive strips 4 which faces the shading tape 3 is provided with an adhesive layer and is stuck to the shading tape 3.

As shown in FIGS. 1 and 3, on the base of the above various embodiments, in a specific embodiment, the backlight module 2 may comprise two light strips 22, which are disposed oppositely to two opposite sides of the light guide plate 21. In this case, the display panel has two light incoming edges and four light incoming corners. The shading tape 30 provided at each light incoming corner of the display panel 1, the shading tape 31 provided at the main bodies of the light incoming edges, and the shading tape 32 provided at the main bodies of the adjacent edges forming the light incoming corners with the light incoming edges have a separated structure, and the side, which faces the display panel 1, of the shading tape 30 provided at the light incoming corners is not provided with an adhesive layer, so the light incoming corners of the display panel 1 would not appear a phenomenon of water ripple and light leakage.

Apparently, those skilled in the art may make various amendments and variations to the embodiments of the invention without departing from the spirit and scope of the invention. As such, in case that these amendments and variations to the invention belong to the scope of the claims and the equivalents thereof in the invention, the invention is intended to include these amendments and variations. It should be noted that, the word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage. Any reference signs in the claims should not be construed as limiting the scope.

The invention claimed is:

1. A display device, comprising:
   a backlight module comprising a back plate, a light guide plate and a light strip, the light guide plate and the light strip being mounted in the back plate;
   a display panel mounted on the back plate; and
   shading tapes disposed along edges of the display panel and provided between the backlight module and the display panel;
   wherein, in the edges of the display panel, an edge close to the light strip and having an extending direction parallel to that of the light strip is a light incoming edge, each end of the light incoming edge forming a light incoming corner with an end of an adjacent edge;
   wherein the shading tape provided at each light incoming corner, the shading tape provided at a main body, except the ends, of the light incoming edge, and the shading tape provided at a main body, except the ends, of the adjacent edge forming the light incoming corner with the light incoming edge are separate from each other; and
   wherein, on a side, which faces the display panel, of the shading tapes provided at the edges of the display panel, only portions of the shading tapes provided at parts of the edges of the display panel except the light incoming corners of the light incoming edge are provided with an adhesive layer, while the portions of the shading tapes provided at the light incoming corners of the light incoming edge are not provided with an adhesive layer such that parts of the display panel which correspond to the light incoming corners of the light incoming edge do not adhere to the shading tapes provided at the light incoming corners of the light incoming edge.

2. The display device according to claim 1, wherein the backlight module comprises two light strips disposed oppositely to two opposite sides of the light guide plate, such that the display panel has two light incoming edges.

3. The display device according to claim 1, wherein a side, which faces the backlight module, of the shading tapes is provided with an adhesive layer.

4. The display device according to claim 3, wherein the backlight module comprises two light strips disposed oppositely to two opposite sides of the light guide plate, such that the display panel has two light incoming edges.

5. The display device according to claim 1, wherein the shading tapes are located between the display panel and the back plate.

6. The display device according to claim 5, wherein the backlight module comprises two light strips disposed oppositely to two opposite sides of the light guide plate, such that the display panel has two light incoming edges.

7. The display device according to claim 1, wherein the backlight module further comprises a prism mounted in the back plate and located between the light guide plate and the display panel, and a protection layer located between the prism and the display panel, and wherein the shading tapes are located between the display panel and the protection layer.

8. The display device according to claim 7, wherein the backlight module comprises two light strips disposed oppositely to two opposite sides of the light guide plate, such that the display panel has two light incoming edges.

9. The display device according to claim 7, wherein the display panel comprises a lower polarizer, an array substrate, a liquid crystal layer, a color film layer and an upper polarizer which are arranged in turn from a light incoming side to a light outgoing side, wherein a side of the lower polarizer which is near the light incoming edge is located on a side of the array substrate which faces the backlight module, wherein a stepped structure is formed between the lower polarizer and the array substrate, and wherein adhesive strips are provided between the shading tapes at the light incoming edge and at the light incoming corner and the array substrate, for compensating for a gap in a panel thickness direction between the shading tapes and the array substrate.

10. The display device according to claim 9, wherein the backlight module comprises two light strips disposed oppositely to two opposite sides of the light guide plate, such that the display panel has two light incoming edges.

11. The display device according to claim 9, wherein the adhesive strip provided between the shading tape at each light incoming corner and the array substrate and the adhesive strip provided between the shading tape at the main body of the light incoming edge and the array substrate are separate from each other, and wherein, on a side, which faces the display panel, of the adhesive strips, only portions of the adhesive strips provided between the shading tape at the main body of the light incoming edge and the array substrate are provided with an adhesive layer, while the portions of the adhesive strips provided between the shading tape at the light incoming corner and the array substrate are not provided with an adhesive layer such that the light incoming corner does not adhere to the adhesive strip provided between the shading tape at the light incoming corner and the array substrate.

12. The display device according to claim 11, wherein the backlight module comprises two light strips disposed oppositely to two opposite sides of the light guide plate, such that the display panel has two light incoming edges.

13. The display device according to claim 11, wherein a side, which faces the shading tapes, of the adhesive strips is provided with an adhesive layer, and wherein the side of the adhesive strips which faces the shading tapes is stuck to the shading tapes.

14. The display device according to claim 13, wherein the backlight module comprises two light strips disposed oppositely to two opposite sides of the light guide plate, such that the display panel has two light incoming edges.

* * * * *